United States Patent [19]

Sunahara

[11] Patent Number: 5,093,780
[45] Date of Patent: Mar. 3, 1992

[54] INTER-PROCESSOR TRANSMISSION SYSTEM HAVING DATA LINK WHICH AUTOMATICALLY AND PERIODICALLY READS AND WRITES THE TRANSFER DATA

[75] Inventor: Hazime Sunahara, Kawasaki, Japan

[73] Assignee: Fujitsu Limited, Kawasaki, Japan

[21] Appl. No.: 423,217

[22] Filed: Oct. 18, 1989

[30] Foreign Application Priority Data

Oct. 18, 1988 [JP] Japan .................. 63-262324

[51] Int. Cl.⁵ .................. G06F 15/00; G06F 13/00
[52] U.S. Cl. .................. 395/800; 364/242.3; 364/DIG. 1
[58] Field of Search .................. 364/200, 900

[56] References Cited

U.S. PATENT DOCUMENTS

| | | | |
|---|---|---|---|
| 4,168,469 | 10/1977 | Parikh | 325/38 |
| 4,433,378 | 2/1984 | Leger | 364/200 |
| 4,590,468 | 5/1986 | Stieglitz | 340/825.5 |
| 4,646,232 | 2/1987 | Chang | 364/200 |

Primary Examiner—Dale M. Shaw
Assistant Examiner—Andrew Bodendorf
Attorney, Agent, or Firm—Staas & Halsey

[57] ABSTRACT

An inter-processor transmission system comprises first and second processors which are coupled via a data link apparatus. The first processor simply writes transfer data into a memory which is coupled thereto with a predetermined period, and the data link apparatus automatically reads the transfer data from the memory and transfers the read transfer data to a memory which is coupled to the second processor in a direct memory access mode.

10 Claims, 4 Drawing Sheets

INTER-PROCESSOR TRANSMISSION SYSTEM HAVING DATA LINK WHICH AUTOMATICALLY AND PERIODICALLY READS AND WRITES THE TRANSFER DATA

BACKGROUND OF THE INVENTION

The present invention generally relates to inter-processor transmission systems, and more particularly to an inter-processor transmission system which has reduced load on the software.

The utilization limit of the multiprocessor system is rapidly expanding so as to share the load, distribute the functions and distribute the danger. In the multiprocessor system, the positive high-speed data transmission between the processors is an important factor.

As methods of realizing the positive high-speed data transmission between the processors, the following two methods are conventionally used. The two methods are the common memory system and the data link system.

The common memory system will be described in conjunction with FIG. 1. According to the common memory system, each processor can make access to a common memory. In FIG. 1, a processor 10 and a memory 11 are coupled via a bus 12, and a processor 20 and a memory 21 are coupled via a bus 22. A common memory 30 is coupled to the buses 12 and 22. Data are first written into the memory 11 under the control of the processor 10. Then, the processor 10 transfers the data to an address Ai of the common memory 30. The processor 20 reads the data from the address Ai of the common memory 30 and stores the data into the memory 22. The processors 10 and 20 need not necessarily operate in synchronism, but the processors 10 and 20 operate in sequence so that the processor 20 reads the data from the address Ai of the common memory 30 after the processor 10 writes the data which is stored in the memory 11 to the common memory 30 at the address Ai, and the processor 20 reads the data from the address Ai of the common memory 30 before the processor 10 writes the next data which is stored in the memory 11 to the common memory 30 at the address Ai.

However, the common memory system suffers problems in that the bus structure of the processor becomes complex and an exclusive control is necessary when making an access to the same memory region, thereby making the hardware structure complex. In addition, the coupling between the processors is an intimate coupling, and as a result, there are restrictions on the software of the processor since the address, sequence and the like of the access must be prearranged.

The data link system will be described in conjunction with FIG. 2. In FIG. 2, those parts which are the same as those corresponding parts in FIG. 1 are designated by the same reference numerals, and a description thereof will be omitted. According to the data link system, the data transfer between the processors is made by use of a high-speed circuit or an inter-processor link. In FIG. 2, a transmitter 14 is coupled to the bus 12 and a receiver 24 is coupled to the bus 22. The transmitter 14 and the receiver 24 are coupled via a transmission line.

According to the data link system, the coupling between the processors is sparse because the transmission may be made at any time. However, the data link system suffers a problem in that the load on the software of the processor is large owing to the software control of the high-speed data transfer.

SUMMARY OF THE INVENTION

Accordingly, it is a general object of the present invention to provide a novel and useful inter-processor transmission system in which the problems described above are eliminated.

Another and more specific object of the present invention is to provide an inter-processor transmission system comprising a first processor, a first memory, a first bus which couples the first processor and the first memory, a second processor, a second memory, a second bus which couples the second processor and the second memory, and a data link apparatus which is coupled between the first and second buses and having a transmitter part which is coupled to the first bus and a receiver part which is coupled to the second bus. The first processor has means for initially setting a first control information in the transmitter part and means for writing a transfer data which is to be transmitted into the first memory with a predetermined period, and the second processor has means for initially setting a second control information in the receiver part. The transmitter part automatically reads the transfer data from the first memory based on the first control information and transfers the read transfer data to the receiver part in a direct memory access mode. The receiver part automatically writes the transfer data received from the transmitter part into the second memory based on the second control information in a direct memory access mode. According to the inter-processor transmission system of the present invention, the load on the software of the processors is greatly reduced compared to the conventional systems. Furthermore, the hardware required to achieve the data transfer between the processors is relatively simple, and the hardware interface required with respect to the main processor is not greatly different from that of the conventional DMA apparatus. The coupling between the two processors is sparse and there is no restriction on the processors.

Other objects and further features of the present invention will be apparent from the following detailed description when read in conjunction with the accompanying drawings.

DESCRIPTION OF THE PREFERRED EMBODIMENTS

Figure 1:
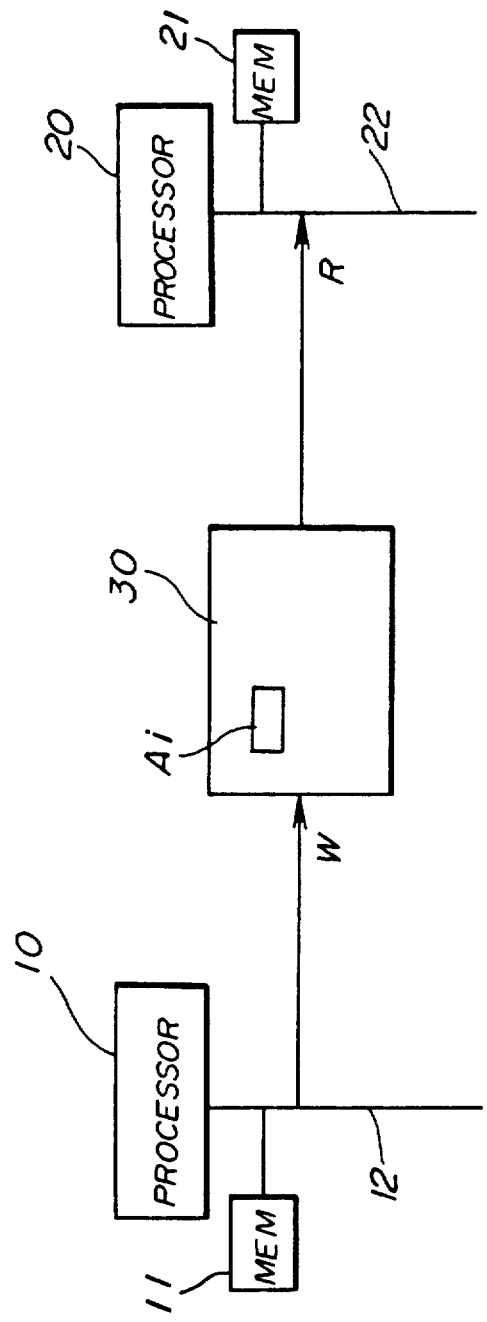
FIG. 1 is a system block diagram showing a conventional common memory system.
Figure 2:
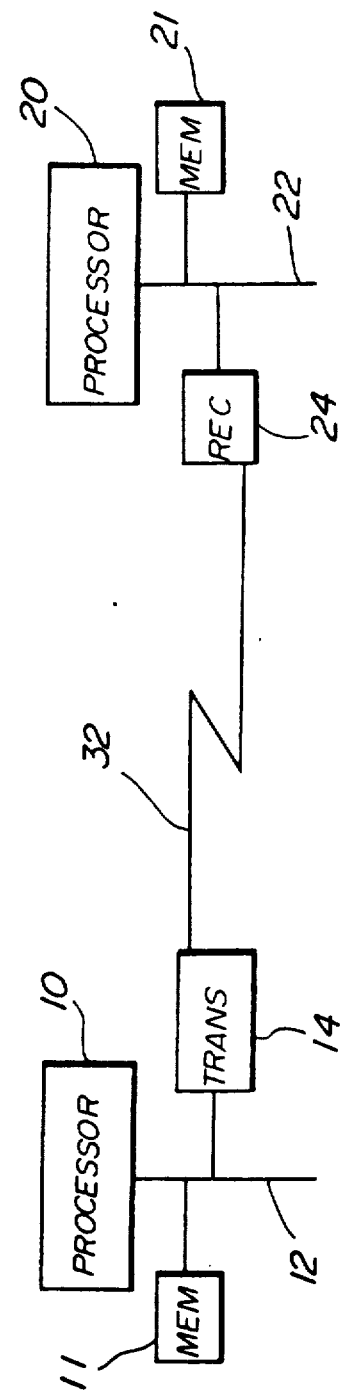
FIG. 2 is a system block diagram showing a conventional data link system.
Figure 3:
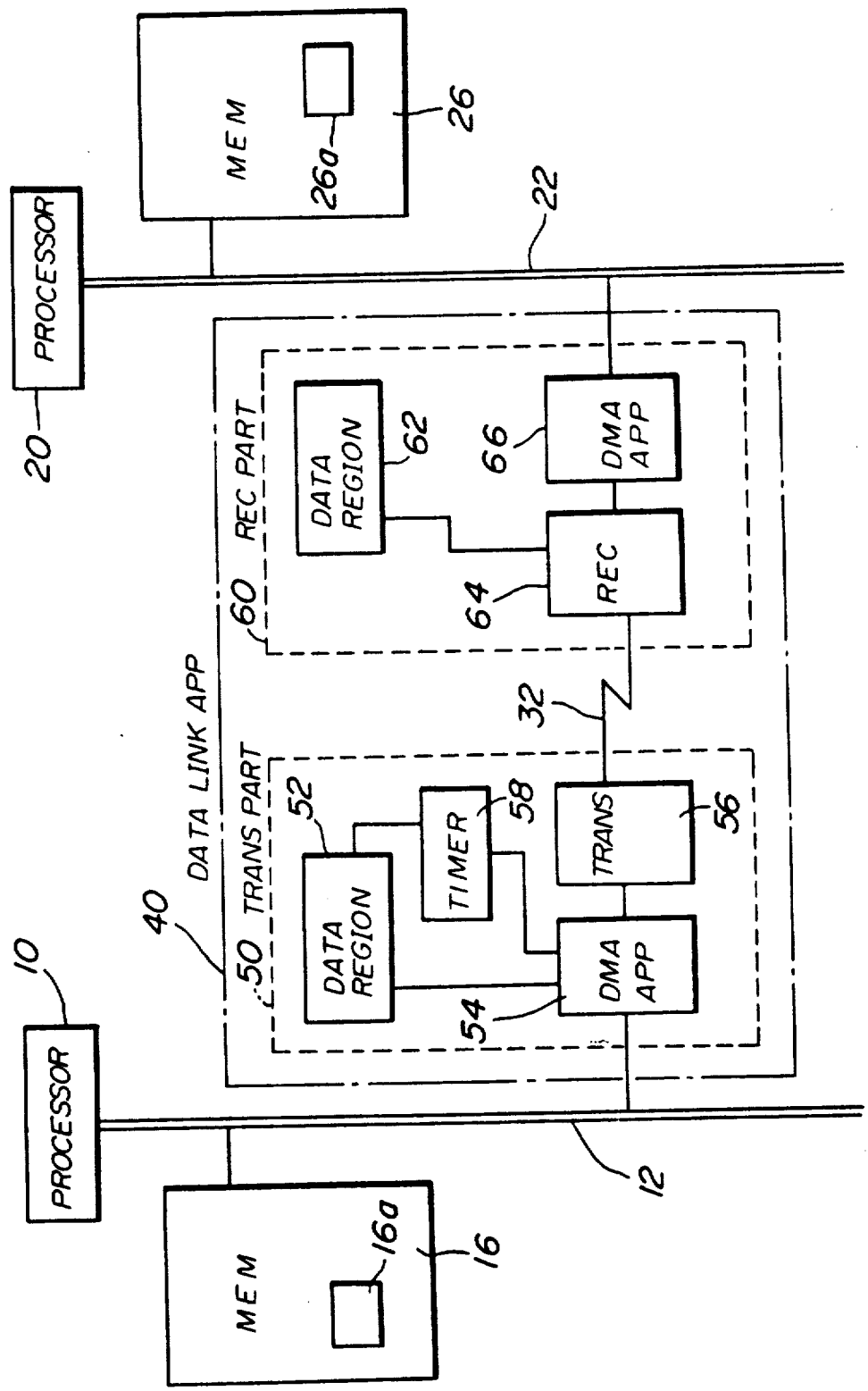
FIG. 3 is a system block diagram showing an inter-processor transmission system according to the present invention for explaining an operating principle thereof.

First, a description will be given of an operating principle of the inter-processor transmission system according to the present invention, by referring to FIG. 3. In FIG. 3, those parts which are substantially the same as those corresponding parts in FIGS. 1 and 2 are designated by the same reference numerals, and a description thereof will be omitted. In FIG. 3, a data link apparatus 40 is coupled to the buses 12 and 22. Hence, the processors 10 and 20 are coupled via the bus 12, the data link apparatus 40 and the bus 22. The data link apparatus 40 comprises a transmitter part 50 and a receiver part 60 which are coupled via the transmission line 32.

The transmitter part 50 includes a software setting data region 52, a direct memory access (DMA) apparatus 54, a transmitter 56 and a timer 58. The DMA apparatus 54 is coupled to the bus 12. The receiver part 60 includes a software setting data region 62, a receiver 64 and a DMA apparatus 66. The DMA apparatus 66 is coupled to the bus 22.

When making a data transfer from the processor 10 to the processor 20, the processor 10 sets a control information in the software setting data region 52 of the data link apparatus 40 by a software control of the processor 10. This control information includes the start address of the transfer data which is stored in a region 16a of a memory 16, the length of the transfer data and a free-running period. The free-running period is set in the timer 58. The DMA apparatus 54 of the data link apparatus 40 runs free with the designated period and reads the transfer data from a memory region 16a of the memory 16 designated by the control information and then transfers the transfer data to the receiver part 60 of the data link apparatus 40 via the transmitter 56 in a DMA mode.

The receiver 64 of the receiver part 60 receives the transfer data from the transmitter part 50 and stores the transfer data in a region 26a of a memory 26 via the DMA apparatus 66 in a DMA mode depending on an information which is written in the software setting data region 62.

According to the present invention, the processor 10 only needs to designate the region 16a of the memory 16 and the data write period with which the data is written to the region 16a. Thereafter, the data link apparatus 40 reads the transfer data from the memory 16 and transfer the transfer data to the designated region 26a of the memory 26, thereby making a data transmission between the processors 10 and 20.

There is no need for the processor 20 to know the address of the memory 16 or the like which is used for the data transfer. In addition, the coupling between the processors 10 and 20 is sparse in that there is plenty of margin to read the data from the memory 26 before the next data is written. Furthermore, the load on the software of the processors 10 and 20 is small because the data transfer is controlled by the data link apparatus 40.

Figure 4:
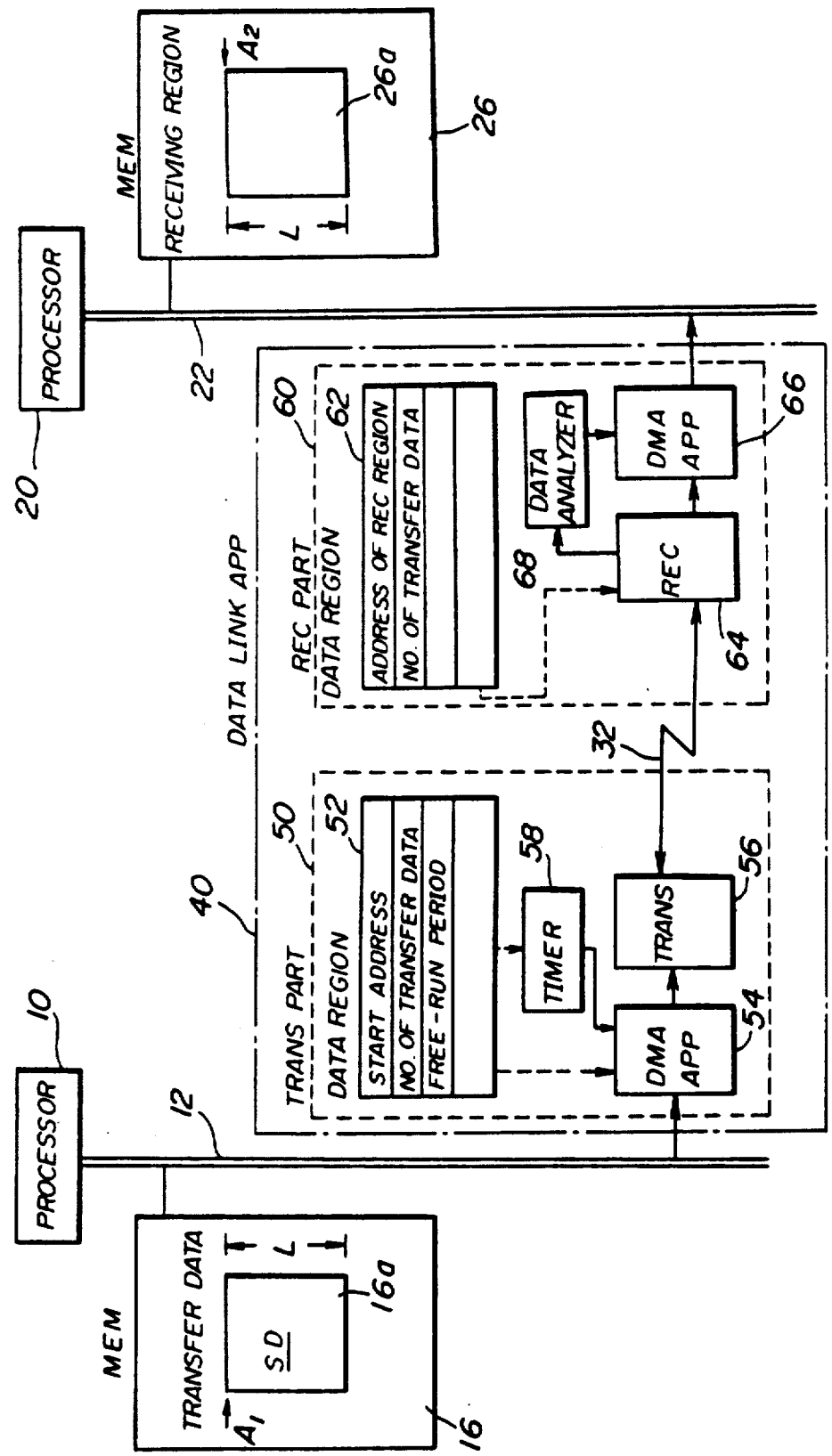
FIG. 4 is a system block diagram showing an embodiment of the inter-processor transmission system according to the present invention.

Next, a description will be given of an embodiment of the inter-processor transmission system according to the present invention, by referring to FIG. 4. In FIG. 4, those parts which are substantially the same as those corresponding parts in FIG. 3 are designated by the same reference numerals, and a description thereof will be omitted. In FIG. 4, the software setting data region 52 of the transmitter part 50 comprises a region for storing the start address of the transfer data, a region for storing the number of transfer data and a region for storing the free-running period. On the other hand, the software setting data region 62 of the receiver part 60 comprises a region for storing the address of the receiving region 26a of the memory 26 and a region for storing the number of transfer data. In addition, the receiver part 60 includes a data analyzer 68.

For the sake of convenience, a description will be given of a case where a transfer data SD within the region 16a of the memory 16 is transferred to the receiving region 26a of the memory 26, that is, to transfer data from the processor 10 to the processor 20.

In this case, the software of the processor 10 operates only once to set the start address of the transfer data SD, the number of transfer data, and the free-running period into the software setting data region 52 of the transmitter part 50. Similarly, the software of the processor 20 operates only once to set the start address of the receiving region 26a and the number of transfer data SD into the software setting data region 62 of the receiver part 60. The setting of these data into the respective software setting data regions 52 and 62 is made for example when the multiprocessor system is started.

In the transmitter part 50 of the data link apparatus 40, the timer 58 is started depending on the data in the software setting data region 52, and the DMA apparatus 54 and the transmitter 56 are triggered when the time is up in the timer 58. The transmitter 56 sends to the receiver 64 a predetermined mark which indicates that a first word will be transmitted. For example, this predetermined mark corresponds to one word. In addition, the DMA apparatus 54 reads the first transfer data from the region 16a of the memory 16 in the DMA mode depending on the data in the software setting data region 52 and sends this transfer data to the transmitter 56. The above described operation is repeated for the number of transfer data. Thereafter, the free-running period is again set in the timer 58 and the transmitter part 50 waits for the next transfer timing.

In the receiver part 60 of the data link apparatus 40, the receiver 64 sends the received transfer data to the data analyzer 68. The data analyzer 68 checks whether or not the received data is the predetermined mark. When the received data is the predetermined mark, the DMA apparatus 66 is initially reset by the data analyzer 68. The data received thereafter is sent directly from the receiver 64 to the DMA apparatus 66 and is written from the start address of the receiving region 26a of the memory 26. The above described operation is repeated for the number of transfer data.

When it is assumed that L bytes of data are to be transferred from the address A1 of the memory 16 with a transfer period T, the processor 10 once sets A1, L and T into the software setting data region 52. Thereafter, the processor 10 simply writes the transfer data into the region 16a of the memory 16 once within the transfer period T, and the DMA apparatus 54 and the transmitter 56 of the transmitter part 50 automatically transfer the transfer data within the region 16a of the memory 16 to the receiver 64 of the receiver part 60 in the DMA mode with the period T. In the receiver part 60, the DMA apparatus 66 writes the received data into the region 26a of the memory 26 designated by the processor 20. As a result, the data transfer is made from the processor 10 to the processor 20.

It is possible to provide another data link apparatus 40 which has the receiver part 60 coupled to the bus 12 and the transmitter part 50 coupled to the bus 22. In this case, it is possible to make a data transfer from the processor 20 to the processor 10.

The free-running period is not included in the data which is set in the software setting data region 62 of the receiver part 60, because the receiver part 60 simply needs to write the received data into the receiving region 26a of the memory 26 when the data is received from the transmitter part 50. Of course, when the next data is transferred to the receiving region 26a with the period T, the processor 20 must read the previous data from the region 26a before the next data is written therein. Hence, the processor 20 needs to know the period T but such conditions are preset when setting up the multiprocessor system.

When the processor 10 writes the transfer data into the region 16a of the memory 16 with a period greater than or equal to the period T, the same transfer data may be read out a plurality of times and transferred. However, this does not introduce problems since there is no dropout of data. On the other hand, when the transfer data is written into the region 16a of the memory within the period T, there is a possibility of losing the previous data by writing the next data before reading the previous data, and thus, the free-running period which is set in the software setting data region 52 of the transmitter part 50 is selected less than or equal to an anticipated minimum period with which the processor 10 writes the transfer data into the region 16a of the memory 16.

In order to cope with the problem of the processor 20 reading the transfer data from the region 26a of the memory 26, it is possible to use a flag which is set until the data is read. By using such a flag, it is possible to write the received data into another region (auxiliary region) of the memory 26 when the flag is set.

Figure 5:
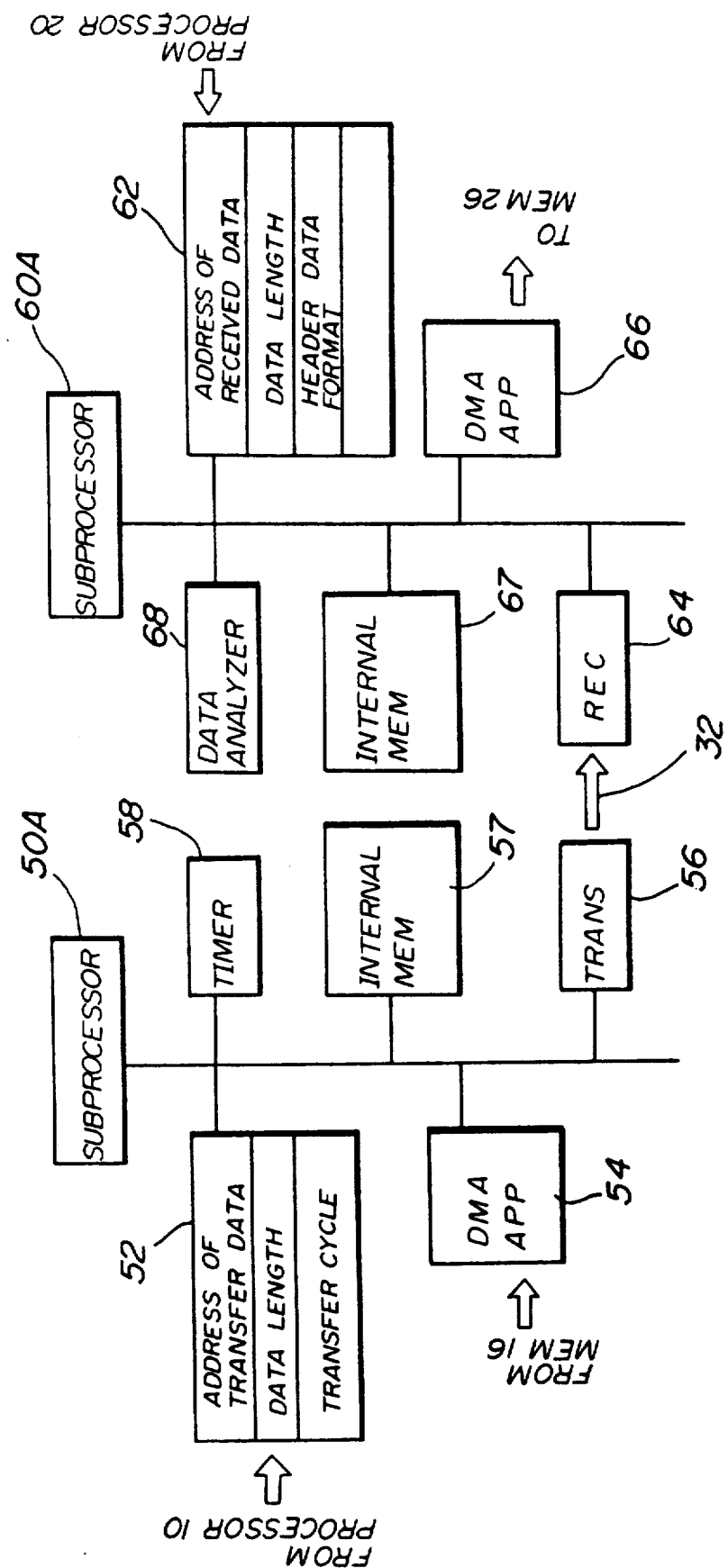
FIG. 5 is a system block diagram showing an embodiment of a data link apparatus shown in FIG. 4.

FIG. 5 shows an embodiment of the data link apparatus 40 shown in FIG. 4. In FIG. 5, those parts which are the same as those corresponding parts in FIG. 4 are designated by the same reference numerals, and a description thereof will be omitted. In FIG. 5, the transmitter part 50 includes a subprocessor 50A for controlling the operation thereof and an internal memory 57, and the receiver part 60 includes a subprocessor 60A for controlling the operation thereof and an internal memory 67. Of course, the timer 58 may be omitted by realizing the timer function by the software of the subprocessor 50A.

Further, the present invention is not limited to these embodiments, but various variations and modifications may be made without departing from the scope of the present invention.

What is claimed is:

1. An inter-processor transmission system comprising:
   a first processor;
   a first memory;
   a first bus which couples said first processor and said first memory;
   a second processor;
   a second memory;
   a second bus which couples said second processor and said second memory; and
   a data link apparatus which is coupled between said first and second buses, said data link apparatus comprising:
      a transmitter part which is coupled to said first bus; and
      a receiver part which is coupled to said second bus, said first processor comprising:
      means for initially setting once first control information in said transmitter part; and
      means for periodically writing according to a predetermined period transfer data which is to be transmitted into said first memory,
   said second processor comprising:
      means for initially setting once second control information in said receiver part,
      said transmitter part automatically and periodically reading the transfer data from said first memory based on the first control information and transferring the transfer data to said receiver part,
      said receiver part automatically and periodically writing the transfer data received from said transmitter part into said second memory based on the second control information.

2. The inter-processor transmission system as claimed in claim 1 wherein said first control information includes a start address of the transfer data which is written in said first memory, a length of the transfer data, and a free-running period that is a constant with which the transmitter part reads the transfer data from said first memory and transfers the read transfer data to said receiver part.

3. The inter-processor transmission system as claimed in claim 2 wherein said second control information includes a start address where the received transfer data is to be written in said second memory.

4. The inter-processor transmission system as claimed in claim 3 wherein said transmitter part includes, means for repeating the transfer of the read transfer data to said receiver part for a number of times corresponding to the number of transfer data included in said first control information.

5. The inter-processor transmission system as claimed in claim 2 wherein said predetermined period is greater than or equal to the free-running period.

6. The inter-processor transmission system as claimed in claim 1 wherein said free-running period is less than or equal to an anticipated minimum value of said predetermined period.

7. The inter-processor transmission system as claimed in claim 1 wherein said transmitter part comprises a first data region in which said first control information is set, a first direct memory access apparatus coupled to said first bus, a transmitter coupled to said first direct memory access apparatus and said receiver part, and a timer which is started based on said first control information for triggering said first direct memory access apparatus and said transmitter, said first direct memory access apparatus reading the transfer data from said first memory and transferring the read transfer data to said transmitter in the direct memory access mode, said transmitter transmitting the read transfer data received from said direct memory access apparatus to said receiver part.

8. The inter-processor transmission system as claimed in claim 7 wherein said receiver part comprises a second data region in which said second control information is set, a receiver for receiving the read transfer data from said transmitter, and a second direct memory access apparatus coupled to said receiver and said second bus for transferring the transfer data received by said receiver to said second memory based on said second control information.

9. The inter-processor transmission system as claimed in claim 8 wherein said transmitter of said transmitter part transmits a predetermined mark indicating that a first word of the transfer data is being transmitted prior to transferring the first word of the transfer data.

10. The inter-processor transmission system as claimed in claim 9 wherein said receiver part further comprises a data analyzer coupled to said receiver and said second direct memory access apparatus for detecting whether or not the received transfer data is the predetermined mark and for initially resetting said second direct memory access apparatus when the predetermined mark is detected.

* * * * *

UNITED STATES PATENT AND TRADEMARK OFFICE
CERTIFICATE OF CORRECTION

PATENT NO. : 5,093,780

DATED : March 3, 1992

INVENTOR(S) : Sunahara

It is certified that error appears in the above-identified patent and that said Letters Patent is hereby corrected as shown below:

Cover page, [54], Title, line 3, delete "AND PERIODICALLY".

[56], line 3, "4,168,469  10/1977  Parikh" should be --4,168,469  9/1979  Parikh et al.--.

Col. 6, line 31, "an" should be --a--; delete "anticipated".

Signed and Sealed this

Twenty-first Day of September, 1993

Attest:

BRUCE LEHMAN

Attesting Officer     Commissioner of Patents and Trademarks